(12) United States Patent
Zhao et al.

(10) Patent No.: US 11,689,817 B2
(45) Date of Patent: Jun. 27, 2023

(54) METHOD AND APPARATUS FOR AUTOMATICALLY DETECTING AND SUPPRESSING FRINGES, ELECTRONIC DEVICE AND COMPUTER-READABLE STORAGE MEDIUM

(71) Applicant: ZHEJIANG UNIVIEW TECHNOLOGIES CO., LTD., Hangzhou (CN)

(72) Inventors: Jian Zhao, Hangzhou (CN); Qiong Xu, Hangzhou (CN); Wenping Zhang, Hangzhou (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 17/292,054

(22) PCT Filed: Apr. 3, 2019

(86) PCT No.: PCT/CN2019/081189
§ 371 (c)(1),
(2) Date: May 7, 2021

(87) PCT Pub. No.: WO2020/093651
PCT Pub. Date: May 14, 2020

(65) Prior Publication Data
US 2021/0400171 A1    Dec. 23, 2021

(30) Foreign Application Priority Data
Nov. 9, 2018 (CN) .......................... 201811329853.4

(51) Int. Cl.
*H04N 23/81* (2023.01)
*G06V 10/56* (2022.01)
(Continued)

(52) U.S. Cl.
CPC .......... *H04N 23/81* (2023.01); *G06F 18/213* (2023.01); *G06V 10/56* (2022.01); *H04N 23/71* (2023.01); *H04N 23/72* (2023.01)

(58) Field of Classification Search
CPC .... H04N 5/217; H04N 5/2351; H04N 5/2352; H04N 5/23229; H04N 5/2353;
(Continued)

(56) References Cited

U.S. PATENT DOCUMENTS

| 2004/0012692 A1 | 1/2004 | Arazaki |
| 2006/0054783 A1 | 3/2006 | Voronov et al. |

(Continued)

FOREIGN PATENT DOCUMENTS

| CN | 1946143 A | 4/2007 |
| CN | 101178812 A | 5/2008 |

(Continued)

OTHER PUBLICATIONS

Bin, H., et al., "New Method for Obtaining the Center of Structured Light Stripe by Direction Template", Technical Report, Institute for Pattern Recognition and Artificial Intelligence of Huazhong University of Science & Technology, Nov. 2002, pp. 1-3.

(Continued)

*Primary Examiner* — Luong T Nguyen
(74) *Attorney, Agent, or Firm* — Byrne Poh LLP

(57) ABSTRACT

Disclosed are a method and apparatus for automatically detecting and suppressing fringes, an electronic device, and a computer-readable storage medium. The method includes the following steps: an image shot by a camera is acquired, and a fringe of the image is recognized; at least one fringe action parameter is acquired among shooting parameters of the camera based on a recognition result obtained by recognizing the fringe of the image; and a parameter adjustment is performed on the acquired fringe action parameter by (Continued)

adopting a parameter adjustment strategy matched with the acquired fringe action parameter, to perform fringe suppression on the image shot by the camera.

20 Claims, 4 Drawing Sheets

(51) Int. Cl.
    *G06F 18/213*     (2023.01)
    *H04N 23/71*     (2023.01)
    *H04N 23/72*     (2023.01)

(58) Field of Classification Search
CPC .... H04N 5/23218; H04N 17/00; H04N 23/81; H04N 23/71; H04N 23/72; H04N 23/73; H04N 23/80; H04N 23/61; G06K 9/6232; G06V 10/56; G06F 18/213
See application file for complete search history.

(56) References Cited

U.S. PATENT DOCUMENTS

| | | |
|---|---|---|
| 2007/0263264 A1 | 11/2007 | Fainstain |
| 2011/0050951 A1 | 3/2011 | Morino |
| 2014/0089365 A1 | 3/2014 | Dubout et al. |
| 2015/0215547 A1* | 7/2015 | Muller ................. H04N 5/2354 348/598 |
| 2016/0180148 A1 | 6/2016 | Smith |
| 2016/0180505 A1* | 6/2016 | Kim .......................... H04N 1/60 382/167 |
| 2017/0337686 A1 | 11/2017 | Wang et al. |
| 2018/0041684 A1 | 2/2018 | Hilldore |
| 2018/0103186 A1 | 4/2018 | Nakagawara |
| 2018/0176463 A1* | 6/2018 | Shintani ................. H04N 5/232 |
| 2019/0114806 A1* | 4/2019 | Omori ................. H04N 5/3572 |

FOREIGN PATENT DOCUMENTS

| | | |
|---|---|---|
| CN | 101193210 A | 6/2008 |
| CN | 102752513 A | 10/2012 |
| CN | 104282011 A | 1/2015 |
| CN | 104424475 A | 3/2015 |
| CN | 105263018 A | 1/2016 |
| CN | 105844655 A | 8/2016 |
| CN | 105957023 A | 9/2016 |
| CN | 106303158 A | 1/2017 |
| CN | 107197158 A | 9/2017 |
| CN | 10734247 A | 2/2018 |
| JP | 2008216648 A | 9/2008 |
| JP | 2018-026716 * | 2/2018 |
| WO | 2018105474 A1 | 6/2018 |

OTHER PUBLICATIONS

International Search Report dated Jun. 28, 2019 in International Patent Application No. PCT/CN2019/081189, pp. 1-4.
Long, Y., et al., "Research on Self-adaptive Extraction Method of Central Points in Complex Light Stripe", In Journal Science Technology and Engineering, vol. 16, No. 14, May 2016, pp. 1-5.
Office Action dated Sep. 25, 2020 in CN Patent Application No. 201811329853.4, pp. 1-13.
Office Action dated Mar. 2, 2021 in CN Patent Application No. 201811329853.4, pp. 1-7.
European Search Report dated Jul. 28, 2022 in EP Patent Application No. 19882892.3, pp. 1-8.
First Search Report dated Sep. 16, 2020 in CN Patent Application No. 201811329853.4, pp. 1-3.
Supplementary Search dated Feb. 2, 2021 in CN Patent Appiication No. 201811329853.4, pp. 1-3.

* cited by examiner

METHOD AND APPARATUS FOR AUTOMATICALLY DETECTING AND SUPPRESSING FRINGES, ELECTRONIC DEVICE AND COMPUTER-READABLE STORAGE MEDIUM

CROSS-REFERENCE TO RELATED APPLICATIONS

The present application is a U.S. National Stage Application of PCT Application Serial No. PCT/CN2019/081189, filed Apr. 3, 2019, which claims priority to Chinese Patent Application No. 201811329853.4, filed with the CNIPA on Nov. 9, 2018, disclosures of which are incorporated herein by reference in their entireties.

TECHNICAL FIELD

The present application relates to image processing technology, for example, a method and apparatus for automatically detecting and suppressing fringes, an electronic device and a computer-readable storage medium.

BACKGROUND

With the increasing demand of the current society for security and protection, various organizations, enterprises or individuals may choose to configure various cameras in indoor or outdoor environments for environmental monitoring. When a light emitting diode (LED) is adopted as a light source in an environment (especially, an indoor environment), since a LED lamp flickers at a frequency of an alternating current (typically, the frequency of the alternating current is 50 Hz or 60 Hz), although human eyes cannot see this flicker phenomenon, some cameras may capture the above flicker to enable fringes to appear in a shot picture.

A main reason for the above-described fringes is that: since an electronic shutter of a camera usually scans line by line to collect data, a condition that a brightness of the LED lamp is bright when one line is scanned, and the brightness of the LED lamp is dark when a next line is scanned is appeared. Moreover, since a scanning speed of a progressive electronic shutter and a frequency of a LED stroboscopic are stable, whereby a picture shot by the camera may present fringes with bright and dark intervals.

In the related art, no effective scheme is provided for the fringes generated by the above reasons existing in the picture shot by the camera, and the requirements of people on the definition and the accuracy of the pictures shot by the camera cannot be satisfied.

SUMMARY

Embodiments of the present application provide a method and apparatus for automatically detecting and suppressing fringes, an electronic device and a computer-readable storage medium, so that fringes in an image shot by a camera can be effectively suppressed.

An embodiment of the present application provides a method for automatically detecting and suppressing fringes. The method includes the following steps: an image shot by a camera is acquired, and a fringe of the image is recognized; at least one fringe action parameter is acquired among shooting parameters of the camera based on a recognition result obtained by recognizing the fringe of the image; and a parameter adjustment is performed on the acquired fringe action parameter by adopting a parameter adjustment strategy corresponding to the acquired fringe action parameter, to perform fringe suppression on the image shot by the camera.

An embodiment of the present application further provides an apparatus for automatically detecting and suppressing fringes. The apparatus includes a fringe recognition module, a fringe action parameter acquisition module and a fringe suppression module. The fringe recognition module is configured to acquire an image shot by a camera and recognize a fringe of the image. The fringe action parameter acquisition module is configured to acquire at least one fringe action parameter among shooting parameters of the camera based on a recognition result obtained by recognizing the fringe of the image. The fringe suppression module is configured to perform a parameter adjustment on the acquired fringe action parameter by adopting a parameter adjustment strategy matched with the acquired fringe action parameter to perform fringe suppression on the image shot by the camera.

An embodiment of the present application further provides an electronic device. The electronic device includes at least one processor and a memory configured to store at least one program. The at least one program, when executed by the at least one processor, causes the at least one processor to implement the method described above.

An embodiment of the present application further provides a computer-readable storage medium. The computer-readable storage medium stores computer programs, and the computer programs, when executed by a processor, implement the method for automatically detecting and suppressing fringes described above.

DETAILED DESCRIPTION

Figure 1:
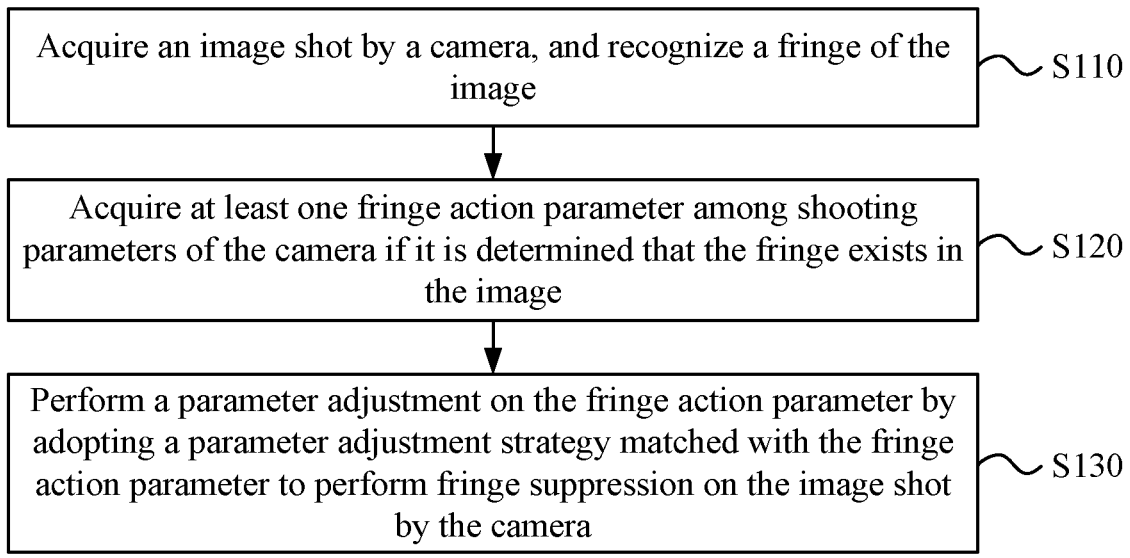
FIG. 1 is a flowchart of a method for automatically detecting and suppressing fringes in embodiment one of the present application.

The present application provides a method for automatically detecting and suppressing fringes. The method includes the following steps: an image shot by a camera is acquired, and a fringe of the image is recognized; at least one fringe action parameter is acquired among shooting parameters of the camera based on a recognition result obtained by recognizing the fringe of the image; and a parameter adjustment is performed on the acquired fringe action parameter by adopting a parameter adjustment strategy matched with the acquired fringe action parameter, to perform fringe suppression on the image shot by the camera.

In an embodiment, the step in which the image shot by the camera is acquired, and the fringe of the image is recognized includes the following steps: the image shot by the camera is acquired, and a feature matrix matched with a detection area is constructed according to feature information of each pixel point within the detection area in the image, where, a matrix value of a pixel point in the feature matrix associated with the fringe is a first numerical value, and a matrix value of a pixel point in the feature matrix not associated with the fringe is a second numerical value; a convolution operation is performed on the feature matrix and a preset fringe feature matrix; and a presence of a fringe in the image is determined based on a determination result that a convolution operation result satisfies a preset numerical condition.

In an embodiment, the feature information is chrominance information of a pixel point.

Before the feature matrix matched with the detection area is constructed according to the feature information of the each pixel point within the detection area in the image, the method further includes the following steps: an RBG value of the each pixel point within the detection area in the image is acquired, and each RBG value is converted into a corresponding YUV value; and a V value of each pixel point is used as the feature information of the each pixel point.

In an embodiment, the step in which the feature matrix matched with the detection area is constructed according to the feature information of the each pixel point within the detection area in the image includes the following steps: an average intensity of the feature information of the each pixel point is calculated according to an image resolution of the detection area and the feature information of the each pixel point; a standard feature matrix is constructed according to the image resolution of the detection area; a matrix element position of the standard feature matrix is acquired as a target matrix position; an element value of the target matrix position is set as the first numerical value based on a determination result that feature information of a pixel point corresponding to the target matrix position is greater than the average intensity; and the element value of the target matrix position is set as the second numerical value based on a determination result that the feature information of the pixel point corresponding to the target matrix position is less than or equal to the average intensity.

In an embodiment, the step in which the at least one fringe action parameter is acquired from the shooting parameters of the camera includes the following steps: at least one of the following is acquired from the shooting parameters of the camera as the fringe action parameter: a shortest frame selection brightness threshold matched with a multi-frame synthesis shooting manner, and a shortest frame brightness adjustment parameter matched with a multi-frame synthesis shooting manner.

The step in which the parameter adjustment is performed on the acquired fringe action parameter by adopting the parameter adjustment strategy matched with the acquired fringe action parameter to perform the fringe suppression on the image shot by the camera includes at least one of the following steps: a value of the shortest frame selection brightness threshold is increased according to a first ratio to reduce a probability of selecting a shortest frame image in a multi-frame synthesis process, where the acquired fringe action parameter includes the shortest frame selection brightness threshold; and the shortest frame brightness adjustment parameter is adjusted to reduce a brightness value of the shortest frame image, where the acquired fringe action parameter includes the shortest frame brightness adjustment parameter.

In an embodiment, the shortest frame brightness adjustment parameter includes an exposure ratio of the camera.

The step in which the shortest frame brightness adjustment parameter is adjusted to reduce the brightness value of the shortest frame image includes the following steps: an average brightness value of the shortest frame image is calculated according to at least two frame images taken by the camera; an exposure ratio increase amplitude is calculated according to the average brightness value and a preset incremental correspondence, where in the incremental correspondence, the average brightness value is positively correlated with the exposure ratio increase amplitude; and longest frame shutter time is kept unchanged, and the exposure ratio of the camera is increased according to the exposure ratio increase amplitude to reduce the brightness value of the shortest frame image.

In an embodiment, the step in which the at least one fringe action parameter is acquired from the shooting parameters of the camera includes the following steps: at least one of the following is acquired from the shooting parameters of the camera as the fringe action parameter: longest frame shutter time matched with a multi-frame synthesis shooting manner, and a longest frame selection brightness threshold matched with a multi-frame synthesis shooting manner.

The step in which the parameter adjustment is performed on the acquired fringe action parameter by adopting the parameter adjustment strategy matched with the acquired fringe action parameter to perform the fringe suppression on the image shot by the camera includes at least one of the following steps: the longest frame shutter time is adjusted to be integral multiple of half of a preset artificial light source alternating current period, where the acquired fringe action parameter includes the longest frame shutter time, and a value of the longest frame selection brightness threshold is increased according to a second ratio to increase a probability of selecting a longest frame image in a multi-frame synthesis process, where the acquired fringe action parameter includes the longest frame selection brightness threshold.

In an embodiment, the step in which the image shot by the camera is acquired, and the fringe of the image is recognized includes the following steps: a brightness recognition parameter of a current shooting environment of the camera is acquired; and the image shot by the camera is acquired and the fringe of the image is recognized based on a determination result that a brightness of the current shooting environment satisfies a fringe recognition condition according to the brightness recognition parameter.

In an embodiment, after the brightness recognition parameter of the current shooting environment of the camera is acquired, the method further includes the following steps: the camera is controlled to continuously shoot images according to a default configuration parameter matched with the current shooting environment based on a determination result that the brightness of the current shooting environment does not satisfy the fringe recognition condition according to the brightness recognition parameter.

In an embodiment, after the parameter adjustment is performed on the acquired fringe action parameter by adopting the parameter adjustment strategy matched with the acquired fringe action parameter, the method further includes the following steps: a brightness recognition parameter matched with a current shooting environment of the camera is acquired; and the camera is controlled to continuously shoot images according to a default configuration parameter matched with the current shooting environment based on a determination result that a brightness of the current shooting environment satisfies a configuration recovery condition according to the brightness recognition parameter.

Embodiment One

FIG. 1 is a flowchart of a method for automatically detecting and suppressing fringes provided in embodiment one of the present application. This embodiment is applicable to suppress fringes existing in an image shot by a camera, and the method may be performed by an apparatus for automatically detecting and suppressing fringes according to embodiments of the present application, and the apparatus may be implemented in at least one of a software manner and a hardware manner, and may be generally integrated in a processor of an camera apparatus. As shown in FIG. 1, the method provided by this embodiment includes the following steps.

In S110, an image shot by a camera is acquired, and a fringe of the image is recognized.

The fringe refers to a fringe formed in the image shot by the camera due to an alternating current. In a process of shooting the image by the camera, for example, when a video camera is used for monitoring, an alternating current light source is often used in an environment, especially in an indoor environment. For example, fluorescent lamps with 50 Hz/60 Hz alternating current are generally used for indoor lighting, and at this time, fringes are easy to appear in the image shot by the camera, which are obvious in areas with a single color.

The occurrence of the fringes directly affects an image quality, and before the occurrence of the fringes is suppressed, whether the fringes exist in an image shot by a current camera may be recognized and determined. The fringes may be light and dark fringes, and may also be color band fringes.

Because a fringe area and other areas in the image has obvious difference in at least one of color and brightness, a fringe and the background image can be distinguished in at least one of a gray scale domain and a chroma domain. Therefore, after an image currently shot by the camera is acquired, a YUV color model, an RGB color model, an LAB color model and the like of the image may be analyzed to determine whether fringes such as light and dark fringes or color band fringes exist in the image; and the currently shot image may also be processed by adopting methods such as feature extraction and the like, and whether the image has a fringe feature or not is analyzed so as to determine whether the image has fringes such as light and dark fringes or color band fringes or not.

As an optional implementation mode of this embodiment, the step in which the image shot by the camera is acquired, and the fringe of the image is recognized may include the following steps: the image shot by the camera is acquired, and a feature matrix matched with a detection area is constructed according to feature information of each pixel point within the detection area in the image, where, a matrix value of a pixel point in the feature matrix associated with the fringe is a first numerical value, and a matrix value of a pixel point in the feature matrix not associated with the fringe is a second numerical value; a convolution operation is performed on the feature matrix and a preset fringe feature matrix; and a presence of a fringe in the image is determined based on a determination result that a convolution operation result satisfies a preset numerical condition.

In this embodiment, each pixel point within the detection area corresponds to a respective numerical value in the feature matrix, that is, a matrix value of the pixel point.

The detection area may be an entire area of the image shot by the camera, or an area selected from the image in which fringes are likely to appear (for example, an area with a single color, such as a wall surface). Typically, if the camera is a monitoring camera (for example, an indoor monitoring camera) in a set area, an area image of an area shot by the camera may be acquired in advance, and the detection area may be determined according to a background image in the area image.

The feature matrix matched with the detection area is constructed according to the feature information of the each pixel point within the detection area. For example, if a resolution of the detection area is w*h, w is a horizontal resolution and h is a vertical resolution, and thus the feature matrix matched with the detection area may be a matrix of w×h.

Since there is a big difference between a feature value of the pixel point associated with the fringe and a feature value of the pixel point not associated with the fringe, the matrix values corresponding to two above types of pixel points may be respectively assigned to a first numerical value and a second numerical value, for example, the first numerical value is 1, and the second numerical value is 0.

In an embodiment, the above feature information may be chrominance information of the pixel point based on the RGB color model and the YUV color model.

In an embodiment, before the feature matrix matched with the detection area is constructed according to the feature information of the each pixel point within the detection area in the image, the method further includes the following steps: an RBG value of the each pixel point within the detection area in the image is acquired, and each RBG value is converted into a corresponding YUV value; and a V value (i.e., a color density) of the each pixel point as the feature information of the each pixel point.

When the resolution of the detection area is w*h, an RGB value of a (i, j)-th pixel point is recorded as f (r, g, b), and then a YUV intensity of the pixel point may be calculated as:

$$Y(i,j)=0.229*r+0.589*g+0.114b$$

$$U(i,j)=-0.147*r-0.289*g+0.436b$$

$$V(i,j)=0.615*r-0.515*g-0.1b$$

Where, r is a red value of the (i, j)-th pixel point, g is a green value of the (i, j)-th pixel point, and b is a blue value of the (i, j)-th pixel point.

Furthermore, the V value of each pixel point, i.e., V (i, j), may be used as feature information of the each pixel point, namely the feature matrix matched with the detection area is constructed according to V values of the pixel points.

As an optional implementation mode of this embodiment, the step in which the feature matrix matched with the detection area is constructed according to the feature information of the each pixel point within the detection area in the image may include the following steps: an average intensity of the feature information is calculated according to an image resolution of the detection area and the feature information of the each pixel point; a standard feature matrix is constructed according to the image resolution of the detection area; one matrix element position of the standard feature matrix is acquired as a target matrix position; an element value of the target matrix position is set as the first numerical value based on a determination result that feature information of a pixel point corresponding to the target matrix position is greater than the average intensity; the element value of the target matrix position is set as the second numerical value based on a determination result that the feature information of the pixel point corresponding to the target matrix position is less than or equal to the average intensity; and an operation of acquiring the one matrix element position of the standard feature matrix as the target matrix position is performed again until all matrix element positions in the standard feature matrix are processed.

In one implementation, the step in which the feature matrix matched with the detection area is constructed according to the feature information of the each pixel point within the detection area in the image may be achieved by the following steps.

The average intensity DV of the feature information is calculated according to the image resolution w*h of the detection area and the feature information (namely the V value of the pixel point) of the each pixel point so as to obtain $$DV = \frac{\Sigma V(i, j)}{w * h}.$$

The standard feature matrix is constructed according to the image resolution w*h of the detection area, where the standard feature matrix may be a matrix of w×h. Each element value of the standard feature matrix is determined to obtain a target matrix, namely the feature matrix matched with the detection area.

For example, when each element value of the target matrix (i.e., the feature matrix matched with the detection area) is determined, if a V value of a pixel at this position is greater than the average intensity DV, then an element value at this position in the target matrix is assigned the first numerical value, such as 1, and if the V value of the pixel at this position is less than or equal to the average intensity DV, then an element value at this position in the target matrix is assigned the second numerical value, such as 0, until assignment of all positions in the target matrix is completed, and the feature matrix matched with the detection area is obtained.

The convolution operation is performed on the feature matrix and the preset fringe feature matrix.

The preset fringe feature matrix is an operator matrix and is used for marking a fringe feature, the feature may be generally a horizontally continuous strip-shaped area, the strip-shaped area may be a white strip, and thus the operator matrix may be preset as a matrix of m×n, and all element values may be set as the first numerical value 1, where m and n may be determined based on an area size of an intolerable fringe.

The convolution operation is performed on the feature matrix and the preset fringe feature matrix, and if a maximum value of each element of the matrix corresponding to a convolution result is greater than a preset threshold Thr, the convolution result is considered to satisfy a preset numerical condition, and then it is determined that fringe exists in the image. And if the each element of the matrix corresponding to the convolution result is not greater than the preset threshold Thr, the convolution result is considered to not satisfy the preset numerical condition, and then it is determined that no fringe exists in the image.

The matrix corresponding to the convolution result refers to a matrix serving as the convolution result, and the convolution result is a convolution result obtained by performing the convolution operation on the feature matrix and the preset fringe feature matrix.

The above content is a specific implementation mode for determining whether fringe exists in the image or not, and is suitable for one or more frames of synthesized image. Moreover, various determination methods exist, for example, a Y value (color brightness) of each pixel point may be used as feature information of the each pixel point, namely, a feature matrix matched with the detection area is constructed according to the Y value of the each pixel point, further whether fringe exists in the image or not is determined, which is not specifically limited in this embodiment.

In S120, if it is determined that the fringe exists in the image, at least one fringe action parameter is acquired among shooting parameters of the camera.

If it is determined that the fringe exists in the image shot by the camera, the fringe action parameter of the shooting parameters of the camera need to be adjusted, where the fringe action parameter refers to a shooting parameter associated with the fringe, and generation of the fringe may be suppressed by adjusting these shooting parameters.

In S130, a parameter adjustment is performed on the fringe action parameter by adopting a parameter adjustment strategy matched with the fringe action parameter, to perform a fringe suppression on the image shot by the camera.

The fringe action parameter may be an exposure parameter, and correspondingly, the parameter adjustment strategy may be that the exposure parameter is adjusted to suppress the generation of fringe in the image, for example, the exposure parameter such as a shutter, a gain, a brightness is adjusted so as to suppress the fringe in the image.

It is worth noting that the image used for determining whether the fringe exists or not is an image already shot by the camera, i.e., a previewable image. The fringe recognition is performed on the image already shot by the camera (or referred to as a previewable image), and after it is recognized that the fringe exists in the image, the shooting parameters of the camera are adjusted, so that a fringe suppression may be performed on an image subsequently shot by the camera.

According to a technical scheme of the embodiments of the present application, when it is determined that the fringe exists in the image shot by the camera, the parameter adjustment is performed on the fringe action parameter of the shooting parameters of the camera by adopting the parameter adjustment strategy so as to achieve the fringe suppression on the image shot by the camera, so that a problem that a fringe phenomenon exists in the image shot by the camera is solved, and the requirements of people on the clarity and the accuracy of the image shot by the camera are satisfied.

Embodiment Two

On the basis of the above embodiments, this embodiment provides a specific implementation mode, the step in which the at least one fringe action parameter is acquired from the shooting parameters of the camera may include the following steps: at least one of a shortest frame selection brightness threshold matched with a multi-frame synthesis shooting manner and a shortest frame brightness adjustment parameter matched with a multi-frame synthesis shooting manner is acquired from the shooting parameters of the camera as the fringe action parameter.

Furthermore, the step in which the parameter adjustment is performed on the fringe action parameter by adopting the parameter adjustment strategy matched with the fringe action parameter to perform the fringe suppression on the image shot by the camera may include at least one of the following steps: a value of the shortest frame selection brightness threshold is increased according to a first ratio to reduce a probability of selecting a shortest frame image in a multi-frame synthesis process; and the shortest frame brightness adjustment parameter is adjusted to reduce a brightness value of the shortest frame image.

Figure 2:
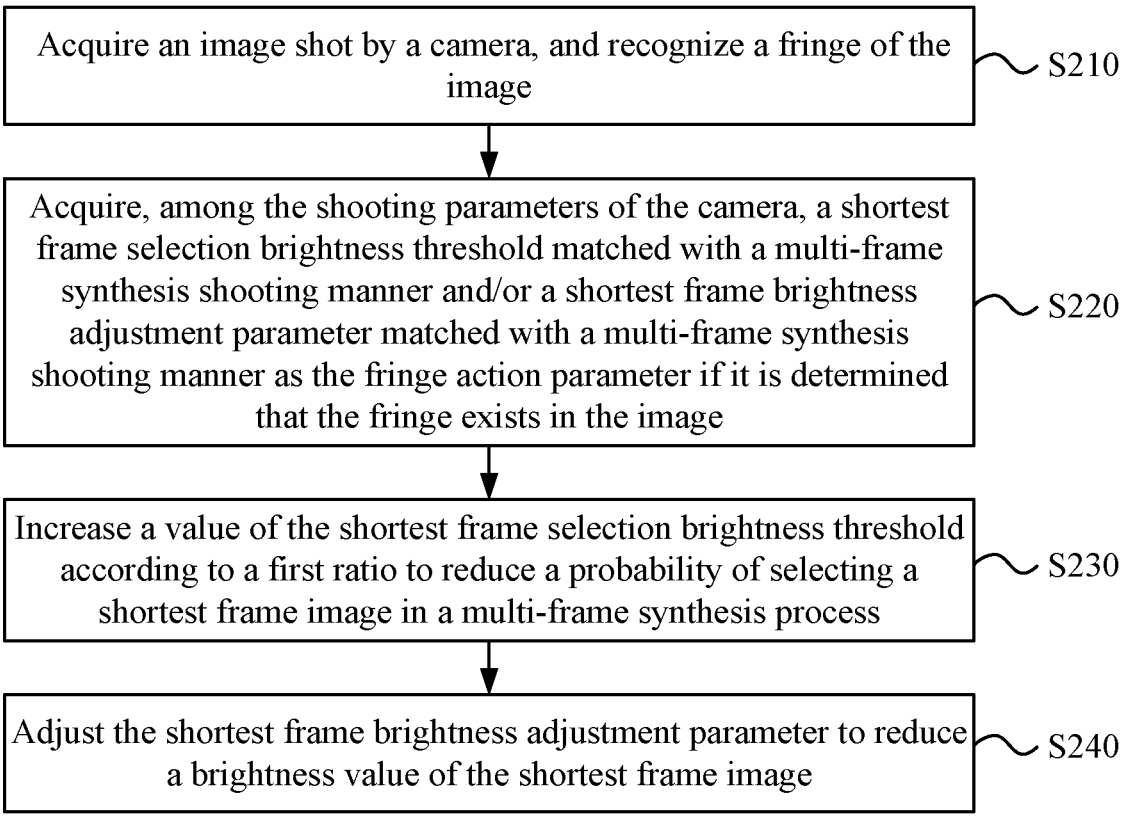
FIG. 2 is a flowchart of a method for automatically detecting and suppressing fringes in embodiment two of the present application.

FIG. 2 is a flowchart of a method for automatically detecting and suppressing fringes provided in embodiment two of the present application, as shown in FIG. 2, the method provided in this embodiment includes the following steps.

In S210, an image shot by a camera is acquired, and a fringe of the image is recognized.

The method for recognizing the fringe of the image is described in detail in the previous embodiments, which is not described in detail herein. After it is determined that fringe exists in the image, a video camera may restrain or eliminate the fringe in two manners: one manner is that alarm information is generated and reported so as to remind a user to update a light source, so that the fringes are eliminated from the source; another manner is that the shooting parameters of the video camera are adjusted to reduce or eliminate the fringes.

In S220, if it is determined that the fringe exists in the image, a shortest frame selection brightness threshold matched with a multi-frame synthesis shooting manner and/or a shortest frame brightness adjustment parameter matched with a multi-frame synthesis shooting manner is acquired from the shooting parameters of the camera as the fringe action parameter.

For a frame of image, the method for adjusting the shooting parameters of the camera may be a method for adjusting shutter time to an integral multiple of half of the alternating current period of the alternating current.

The fringes in the image shot by the video camera and shot in the multi-frame synthesis manner mainly appear in the shortest frame image, so that the fringes in the shortest frame image can be suppressed in this embodiment.

Specifically, at least one of the shortest frame selection brightness threshold of the video camera and the shortest frame brightness adjustment parameter of the video camera are selected as the fringe action parameter.

According to a multi-frame synthesis principle (especially when two frames are synthesized), longest frame data is adopted when a brightness value is less than a first brightness threshold LongThresh, shortest frame data is adopted when the brightness value is greater than a second brightness threshold ShortThresh, and long and short frame fusion is adopted when the brightness value is in a [LongThresh, ShortThresh] interval. Therefore, the shortest frame selection brightness threshold, namely the value of the second brightness threshold ShortThresh, directly affects the use of the shortest frame data, so that the shortest frame selection brightness threshold can be used as the fringe action parameter.

Meanwhile, the brightness of the shortest frame has a direct relation with intensity of fringe on the shortest frame, and the intensity of the fringe can be adjusted by adjusting the brightness of the shortest frame, so that the shortest frame brightness adjustment parameter can be used as the fringe action parameter.

In S230, a value of the shortest frame selection brightness threshold is increased according to a first ratio to reduce a probability of selecting a shortest frame image in a multi-frame synthesis process.

Specifically, the value of the shortest frame selection brightness threshold (in this embodiment, the shortest frame selection brightness threshold may be the second brightness threshold ShortThresh) is increased according to the first ratio, namely, the use of the shortest frame data may be reduced by increasing the second brightness threshold ShortThresh, so as to suppress the generation of fringes.

In an embodiment, the use of shortest frame data may be reduced by increasing the values of the first brightness threshold LongThresh and the second brightness threshold ShortThresh simultaneously. An increase amplitude of the LongThresh and an increase amplitude of the ShortThresh may be the same or different.

In S240, the shortest frame brightness adjustment parameter is adjusted to reduce a brightness value of the shortest frame image.

The shortest frame brightness adjustment parameter is adjusted to reduce the brightness value of the shortest frame image, so that the intensity of fringe on the shortest frame image is further weakened, and the effect of weakening the fringe is achieved.

The shortest frame brightness adjustment parameter may be exposure parameters such as an exposure ratio, a shutter, a gain and brightness, and the effect of reducing the brightness value of the shortest frame image is achieved by adjusting these exposure parameters.

For example, the brightness value of the shortest frame image may be directly reduced by reducing shutter time of the shortest frame image, the brightness value of the shortest frame image may also be reduced by reducing the brightness gain of the shortest frame image, and the like, which is not limited by this embodiment.

When the shortest frame selection brightness threshold and the shortest frame brightness adjustment parameter are selected as the fringe action parameter, the operation of S230 and the operation of S240 may be executed respectively so as to adjust the two above fringe action parameters, execution sequences of S230 and the execution sequence of S240 may be interchanged, and if only one of the shortest frame selection brightness threshold and the shortest frame brightness adjustment parameter is selected as a fringe parameter, then a corresponding adjustment operation in S230 and S240 is executed.

As an optional implementation mode of this embodiment, the shortest frame brightness adjustment parameter is the exposure ratio of the camera. The brightness of the shortest frame image may be reduced by increasing the exposure ratio of the camera.

Correspondingly, the step in which the shortest frame brightness adjustment parameter is adjusted to reduce the brightness value of the shortest frame image may include the following steps: an average brightness value of the shortest frame image is calculated according to at least two frame images taken by the camera, where the shortest frame image refers to a frame of image with a shortest frame length between the at least two frames images shot by the camera; an exposure ratio increase amplitude is calculated according to the average brightness value and a preset incremental correspondence, where in the incremental correspondence, the average brightness value is positively correlated with the exposure ratio increase amplitude; and longest frame shutter time is kept unchanged, and the exposure ratio of the camera is increased according to the exposure ratio increase amplitude to reduce the brightness value of the shortest frame image.

The brightness value of the shortest frame image of the multiple frames of images shot by the camera is counted, the average brightness value L of the shortest frame image is calculated according to statistical information and substituted into an exposure ratio increase amplitude calculation formula, whereby the exposure ratio increase amplitude can be determined.

In a specific implementation, a brightness value of each pixel in a short frame image can be acquired, and an average value of brightness values of all pixels in the short frame image is used as the average brightness value of the shortest frame image.

Optionally, a preset incremental correspondence may be:

$$\Delta R = e^{\frac{(ShortThresh - L)^2}{2\sigma^2}},$$

where $\sigma$ is a constant.

In the above incremental correspondence, the average brightness value L is positively correlated with the exposure ratio increase amplitude $\Delta R$.

In a case where the longest frame shutter time is not changed, the exposure ratio of the camera is increased according to the preset incremental correspondence, that is, a current exposure ratio R of the camera is increased to R+$\Delta R$, and thus the brightness value of the shortest frame image can be reduced.

According to the above technical schemes, the use of the shortest frame data of the multi-frame composite image is reduced by adopting a technical scheme that the value of the shortest frame selection brightness threshold is increased and meanwhile the shortest frame image brightness is reduced, and thus the suppression of fringe in the image is achieved.

Embodiment Three

On the basis of the above embodiments, this embodiment provides a specific implementation mode, the step in which at least one fringe action parameter matched with a shooting manner of the camera is acquired from the shooting parameters of the camera includes the following steps: at least one of longest frame shutter time matched with a multi-frame synthesis shooting manner and a longest frame selection brightness threshold matched with a multi-frame synthesis shooting manner is acquired from the shooting parameters of the camera as the fringe action parameter.

Furthermore, the step in which the parameter adjustment is performed on the fringe action parameter by adopting the parameter adjustment strategy matched with the fringe action parameter to perform the fringe suppression on the image shot by the camera may include at least one of the following steps: the longest frame shutter time is adjusted to be integral multiple of half of the preset artificial light source alternating current period so as to eliminate fringe in a longest frame image (namely a frame of image with a longest frame length of the images shot by the camera); and a value of the longest frame selection brightness threshold is increased according to a second ratio to increase a probability of selecting the longest frame image in a multi-frame synthesis process.

Figure 3:
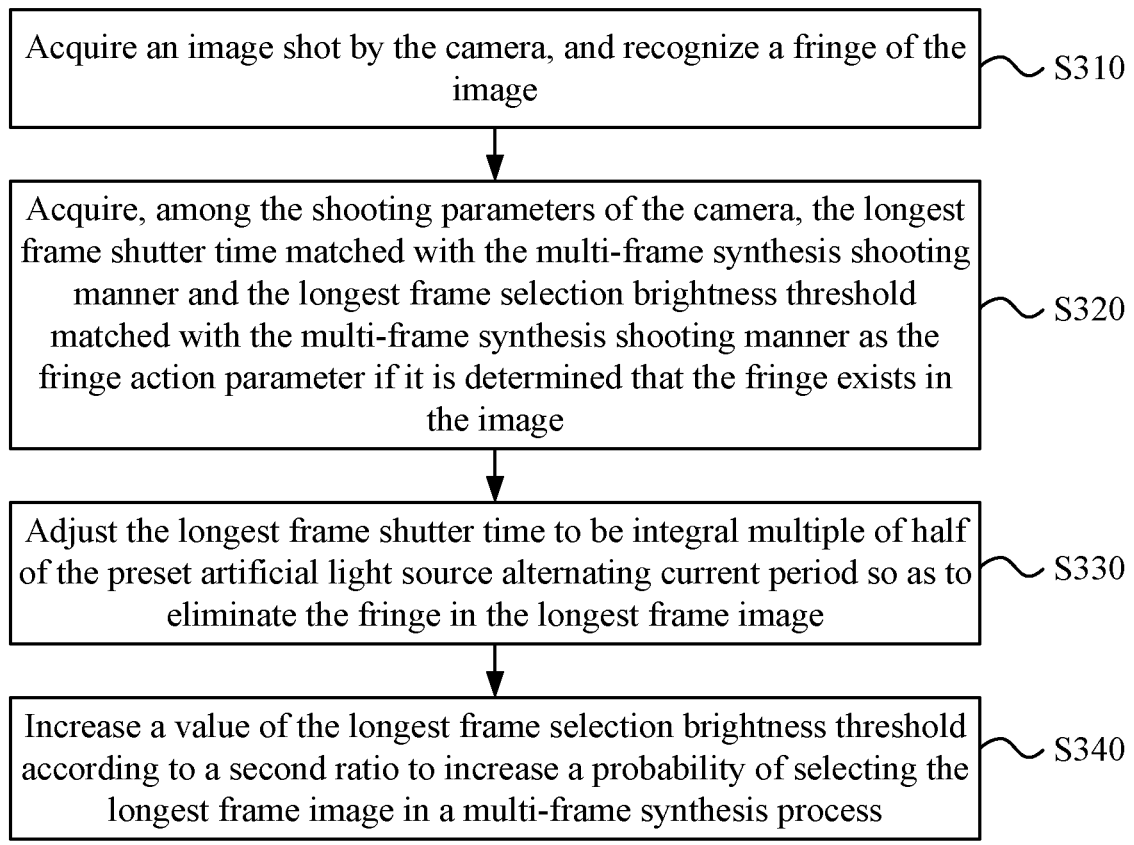
FIG. 3 is a flowchart of a method for automatically detecting and suppressing fringes in embodiment three of the present application.

FIG. 3 is a flowchart of a method for automatically detecting and suppressing fringes provided in embodiment three of the present application. As shown in FIG. 3, the method provided in this embodiment includes the following steps.

In S310, an image shot by the camera is acquired, and a fringe of the image is recognized.

The method for identifying the fringes of the image is described in detail in the previous embodiment, which is not described in detail herein.

In S320, if it is determined that the fringe exists in the image, the longest frame shutter time matched with the multi-frame synthesis shooting manner and the longest frame selection brightness threshold matched with the multi-frame synthesis shooting manner are acquired from the shooting parameters of the camera as the fringe action parameter.

In this embodiment, considering that the fringes mainly appear in a shortest frame image, a use frequency (probability) of a longest frame during multi-frame synthesis is improved on the basis of ensuring that no fringe exists on the longest frame image, so that the fringes can be suppressed, and further when the fringes are weakened or eliminated by adjusting shooting parameters of a video camera, at least one of the longest frame shutter time and the longest frame selection brightness threshold is selected as the fringe action parameter.

In S330, the longest frame shutter time is adjusted to be integral multiple of half of a preset artificial light source alternating current period so as to eliminate fringe in the longest frame image.

When a shooting is performed in a multi-frame synthesis shooting manner, shutter time of the longest frame image is set to be integer multiple of half of the alternating current period, so that fringe in the longest frame image can be eliminated.

For example, if a frequency of the artificial light source alternating current is 50 Hz, an artificial light source alternating current period is 0.02 s, whereby the shutter time of the longest frame image is set to an integer multiple of 0.01 s.

In S340, a value of the longest frame selection brightness threshold is increased according to a second ratio to increase a probability of selecting the longest frame image in a multi-frame synthesis process.

According to a multi-frame synthesis principle, longest frame data is adopted when a brightness value is less than a first brightness threshold LongThresh, shortest frame data is adopted when the brightness value is greater than a second brightness threshold ShortThresh, and long and short frame fusion is adopted when the brightness value is in a [LongThresh, ShortThresh] interval.

Specifically, the value of the longest frame selection brightness threshold (in this embodiment, the longest frame selection brightness threshold may be the first brightness threshold LongThresh) is increased according to the second ratio, that is, the use of the longest frame data can be increased by increasing the first brightness threshold LongThresh, so as to suppress the generation of fringes.

In an embodiment, in conjunction with the embodiment two and the embodiment three, the shortest frame selection brightness threshold, the shortest frame brightness adjustment parameter, the longest frame selection brightness threshold, and the longest frame shutter time may be used as the fringe action parameters for parameter adjustment simultaneously, so as to achieve the effect of fringe suppression. For a specific adjustment strategy, please refer to the embodiment two and the embodiment three in detail, which are not described herein again, where increasing amplitudes of the longest frame selection brightness threshold and the shortest frame selection brightness threshold may be the same or different.

In the above technical schemes, the use of the longest frame data of the multi-frame synthetic image is improved by adjusting the longest frame shutter time and increasing the value of the longest frame selection brightness threshold, so that the limitation to the fringes in the image may be achieved.

Embodiment Four

On the basis of the above technical schemes, in this embodiment, the step in which the image shot by the camera is acquired, and the fringe of the image is recognized may include the following steps: a brightness recognition parameter of a current shooting environment of the camera is acquired; and the image shot by the camera is acquired and the fringe of the image is recognized based on a determination result that a brightness of the current shooting environment satisfies a fringe recognition condition according to the brightness recognition parameter; the camera is controlled to continuously shoot images according to a default configuration parameter matched with the current shooting environment based on a determination result that the brightness of the current shooting environment does not satisfy the fringe recognition condition according to the brightness recognition parameter.

According to the method for automatically detecting and suppressing fringes provided in this embodiment, after the parameter adjustment is performed on the acquired fringe action parameter by adopting the parameter adjustment strategy matched with the fringe action parameter, the method further includes the following steps: a brightness recognition parameter matched with a current shooting environment of the camera is acquired; the camera is controlled to continuously shoot images according to a default configuration parameter matched with the current shooting environment based on a determination result that a brightness of the current shooting environment satisfies a configuration recovery condition according to the brightness recognition parameter; and the camera is controlled to continuously shoot images by remaining the current configuration parameter based on a determination result that the brightness of the current shooting environment does not satisfy the configuration recovery condition is determined according to the brightness recognition parameter.

Figure 4:
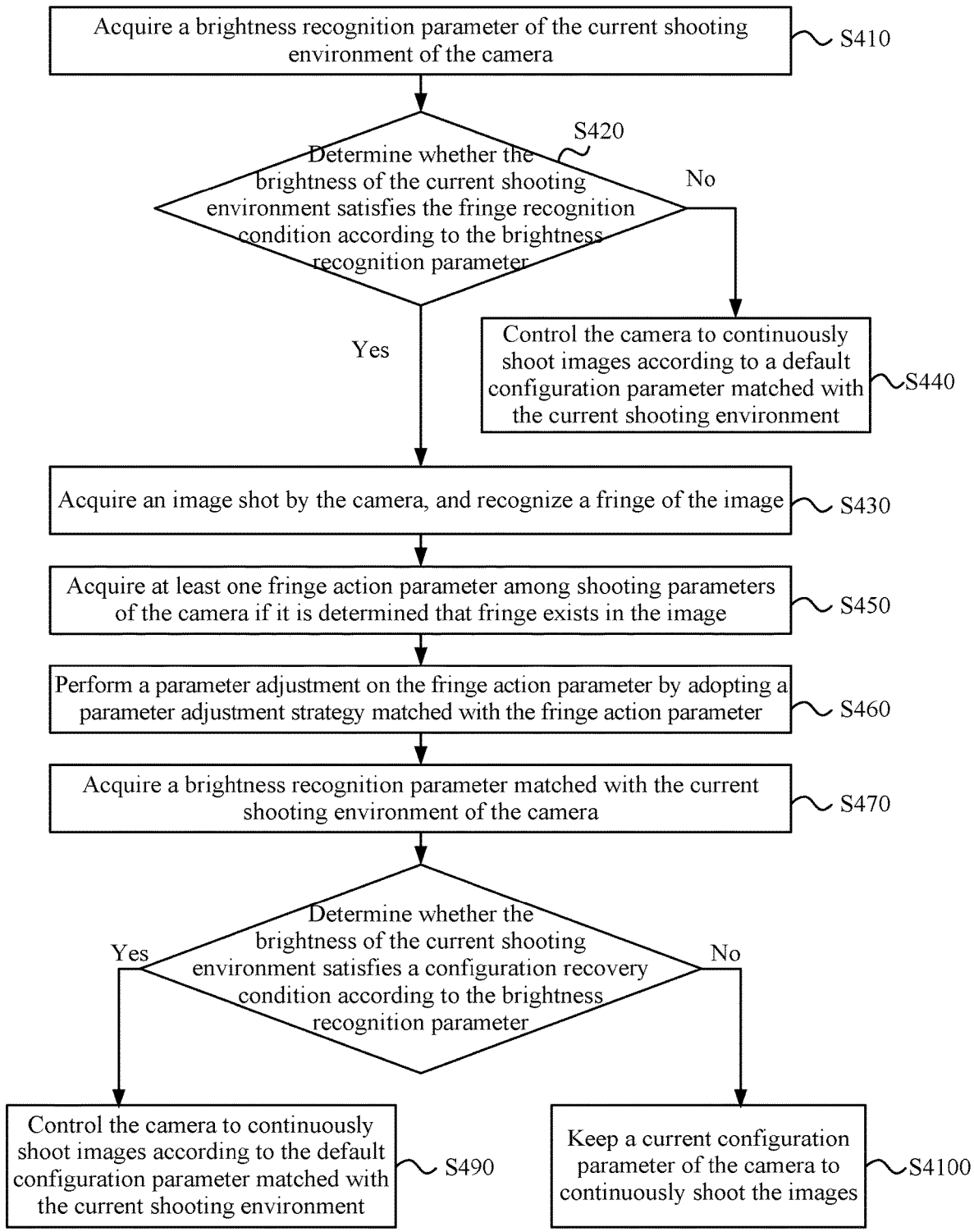
FIG. 4 is a flowchart of a method for automatically detecting and suppressing fringes in embodiment four of the present application.

FIG. 4 is a flowchart of a method for automatically detecting and suppressing fringes provided in embodiment four of the present application, as shown in FIG. 4, the method provided in this embodiment includes the following steps.

In S410, a brightness recognition parameter of the current shooting environment of the camera is acquired.

The brightness recognition parameter refers to a recognition parameter related to brightness, and the brightness recognition parameter may be an ambient brightness and may also be a video camera parameter such as shutter time, gain (i.e., brightness gain), brightness. Specifically, the ambient brightness may be acquired through an ambient brightness sensor. In consideration of a fact that various default configuration parameters of the camera are adaptively adjusted along with different numerical values of the ambient brightness. For example, when a surrounding ambient brightness value is relatively large, among the default configuration parameters of the camera, the shutter time is correspondingly reduced according to a preset corresponding relation, the brightness gain is correspondingly reduced according to a preset corresponding relation, and the like. Therefore, the default configuration parameters of the video camera such as the shutter time and the brightness gain described above may also reflect the brightness of the current shooting environment.

In S420, it is determined whether the brightness of the current shooting environment satisfies the fringe recognition condition according to the brightness recognition parameter, if yes, S430 is performed, and if no, S440 is performed.

Specifically, if the brightness recognition parameter is the ambient brightness, it may be correspondingly set that the fringe recognition condition is satisfied when the ambient brightness is greater than or equal to a set brightness threshold; or, if the brightness recognition parameter is the shutter time, it may be correspondingly set that the fringe recognition condition is satisfied when the shutter time is less than or equal to a set time threshold.

In S430, an image shot by the camera is acquired, and a fringe of the image is recognized.

In S440, the camera is controlled to continuously shoot images according to a default configuration parameter matched with the current shooting environment.

The selection of the brightness recognition parameter as the ambient brightness is used as an example. For a frame of image, when the ambient brightness is very low, no fringe usually exists in the image, so that if a current ambient brightness is determined to be lower than the brightness threshold, the brightness of the current shooting environment does not satisfy the fringe recognition condition, and the fringe recognition cannot be performed. For a multi-frame image, when the ambient brightness is very low, the image effect is poor, and at this time, the multi-frame image is not suitable for being subjected to excessive limitation, that is, the fringe recognition is not needed, namely, the brightness of the current shooting environment does not satisfy the fringe recognition condition. Correspondingly, if the current ambient brightness is higher than the brightness threshold, the fringe recognition needs to be performed on the image.

In S450, if it is determined that fringe exists in the image, at least one fringe action parameter is acquired among shooting parameters of the camera.

In S460, a parameter adjustment is performed on the fringe action parameter by adopting a parameter adjustment strategy matched with the fringe action parameter.

For a specific process of recognizing the fringe of the image and performing the parameter adjustment on the fringe action parameter when the fringe is determined to exist, please refer to the previous embodiments, which is not described in detail herein.

In S470, a brightness recognition parameter matched with the current shooting environment of the camera is acquired.

After the parameter adjustment is performed on the fringe action parameter of the video camera, the brightness recognition parameter matched with the current shooting environment of the camera need to be acquired again, and whether a default setting of the video camera needs to be recovered in the current shooting environment or not is determined.

Optionally, after the parameter adjustment is performed on the fringe action parameter of the video camera, in a process of controlling the camera to perform the shooting, the brightness recognition parameter is periodically acquired at intervals of a set time length (such as 5 minutes, 10 minutes or 30 minutes) so as to determine whether the default configuration parameter of the video camera are recovered or not. Similarly, in a process of controlling the camera to use the default configuration parameter for shooting, the brightness recognition parameter is periodically acquired at intervals of a set time length (such as 5 minutes, 10 minutes or 30 minutes) so as to determine whether the parameter adjustment is performed on the fringe action parameter of the video camera.

In S480, it is determined whether the brightness of the current shooting environment satisfies a configuration recovery condition according to the brightness recognition parameter, if yes, S490 is performed, and if no, S4100 is performed.

In S490, the camera is controlled to continuously shoot images according to the default configuration parameter matched with the current shooting environment.

In S4100, a current configuration parameter of the camera is kept and the camera continuously shoots the image.

The selection of the brightness recognition parameter as the ambient brightness is used as an example. As mentioned earlier, for a frame of image, when the ambient brightness is very low, no fringe usually exists in the image, so that if the current ambient brightness is determined to be lower than the brightness threshold, the configuration recovery condition is satisfied, and the camera needs to be controlled to recover the default configuration parameter. Due to a problem that image overexposure usually exists after the external illuminance becomes strong, if the default configuration parameter is selected to be recovered, it can be ensured that the image is not overexposed, and at this time, it can also be determined that the brightness of the current shooting environment satisfies the configuration recovery condition, and the camera needs to be controlled to recover the default configuration parameter. For a multi-frame image, when the ambient brightness is very low, the image effect is poor, and at this time, the multi-frame image is not suitable for being subjected to excessive limitation, and a default configuration needs to be recovered, so that the configuration recovery condition is satisfied, and the camera may be controlled to continuously shoot the images according to the default configuration parameter matched with the current shooting environment so as to enable the image to be in an optimal state.

Specifically, the brightness recognition parameter matched with the current shooting environment of the camera is acquired, it is determined whether the brightness of the current shooting environment satisfies the fringe recognition condition according to the brightness recognition parameter, and it is determined whether the brightness of the current shooting environment satisfies the configuration recovery condition according to the brightness recognition parameter, which may be a real-time determination or a timing determination, and is intended to adjust the shooting parameters of the video camera to be always matched with the current shooting environment as much as possible.

It should be emphasized that only one process of switching from the default configuration parameter of the camera to a configuration parameter after the fringe action parameter is adjusted and one process of switching from the configuration parameter after the fringe action parameter of the camera is adjusted to the default configuration parameter are described in this embodiment. In a specific implementation, the method of this embodiment may be performed periodically in a loop when the camera is used in an actual scene (typical, surveillance area). That is to say, after S440 is performed and after an interval of a set time has elapsed, S410 is performed again; after S490 is performed and after the interval of the set time has elapsed, S410 is performed again; and after S4100 is performed and after the interval of the set time has elapsed, S470 is performed again.

In the above technical schemes, it is determined whether the brightness of the current shooting environment satisfies the fringe recognition condition or not in real time or regularly according to the brightness recognition parameter, and it is determined whether the brightness of the current shooting environment satisfies the configuration recovery condition or not in real time or regularly according to the brightness recognition parameter, and the shooting parameters of the video camera are adjusted according to the determination result so as to enable the shooting parameters of the video camera to be matched with the current environment, whereby fringes in the image shot by the camera are weakened or eliminated, and the clarity and accuracy of the image shot by the camera are improved.

Embodiment Five

Figure 5:
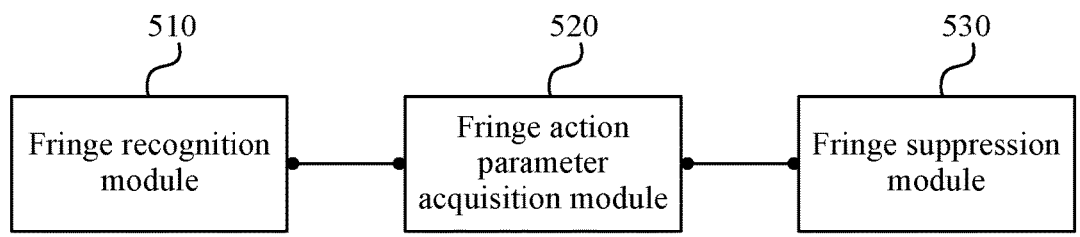
FIG. 5 is a schematic structural diagram of an apparatus for automatically detecting and suppressing fringes in embodiment five of the present application.

FIG. 5 is a schematic structural diagram of an apparatus for automatically detecting and suppressing fringes provided in embodiment five. This embodiment is applicable to suppress fringes existing in an image shot by a camera, and the apparatus may be implemented in at least one of a software manner and a hardware manner, and may be generally integrated in a processor of a camera apparatus. As shown in FIG. 5, the apparatus may include a fringe recognition module 510, a fringe action parameter acquisition module 520 and a fringe suppression module 530. The fringe recognition module 510 is configured to acquire an image shot by a camera and recognize a fringe of the image. The fringe action parameter acquisition module 520 is configured to acquire at least one fringe action parameter among shooting parameters of the camera based on a recognition result obtained by recognizing the fringe of the image. The fringe suppression module 530 is configured to perform a parameter adjustment on the fringe action parameter by adopting a parameter adjustment strategy matched with the fringe action parameter to perform fringe suppression on the image shot by the camera.

According to the technical scheme of this embodiment, when it is determined that the fringe exists in the image shot by the camera, the parameter adjustment is performed on the fringe action parameter of the shooting parameters of the camera by adopting the parameter adjustment strategy so as to achieve the fringe suppression on the image shot by the camera, so that a problem that a fringe phenomenon exists in the image shot by the camera is solved, and the requirements of people on the clarity and the accuracy of the image shot by the camera are satisfied.

In an embodiment, the fringe recognition module 510 includes a feature matrix construction unit, a convolution operation unit and a fringe determination unit. The feature matrix construction unit is configured to acquire the image shot by the camera, and construct a feature matrix matched with a detection area according to feature information of each pixel point within the detection area in the image, where a matrix value of a pixel point in the feature matrix associated with the fringe is a first numerical value, and a matrix value of a pixel point in the feature matrix not associated with the fringe is a second numerical value. The convolution operation unit is configured to perform a convolution operation on the feature matrix and a preset fringe feature matrix. The fringe determination unit is configured to determine a presence of a fringe in the image based on a determination result that a convolution operation result satisfies a preset numerical condition.

Specifically, the feature information is chrominance information of a pixel point.

Correspondingly, the fringe recognition module 510 further includes a pixel point YUV value calculation unit and a feature information determination unit. The pixel point YUV value calculation unit is configured to, before constructing the feature matrix matched with the detection area and according to the feature information of the each pixel point within the detection area in the image, acquire a RBG value of the each pixel point within the detection area in the image, and convert each RBG value into a corresponding YUV value. The feature information determination unit is configured to use a V value of each pixel point as the feature information of the each pixel point.

In an embodiment, the feature matrix construction unit includes an average intensity calculation subunit, a standard feature matrix construction subunit, a target matrix position acquisition subunit, a first element value setting subunit, a second element value setting subunit and a loop processing subunit. The average intensity calculation subunit is configured to calculate an average intensity of the feature information according to an image resolution of the detection area and the feature information of the each pixel point. The standard feature matrix construction subunit is configured to construct a standard feature matrix according to the image resolution of the detection area. The target matrix position acquisition subunit is configured to acquire one matrix element position of the standard feature matrix as a target matrix position. The first element value setting subunit is configured to set an element value of the target matrix position as the first numerical value based on a determination result that feature information of a pixel point corresponding to the target matrix position is greater than the average intensity. The second element value setting subunit is configured to set the element value of the target matrix position as the second numerical value based on a determination result that the feature information of the pixel point corresponding to the target matrix position is less than or equal to the average intensity. The loop processing subunit is configured to return and execute an operation of acquiring one matrix element position of the standard feature matrix as the target matrix position until all matrix element positions in the standard feature matrix are processed.

On the basis of the above technical schemes, the fringe action parameter acquisition module 520 is configured to acquire at least one of a shortest frame selection brightness threshold matched with a multi-frame synthesis shooting manner and a shortest frame brightness adjustment parameter matched with a multi-frame synthesis shooting manner among the shooting parameters of the camera as the fringe action parameter.

Correspondingly, the fringe suppression module 530 is configured to perform at least one of the following steps: a value of the shortest frame selection brightness threshold is increased according to a first ratio to reduce a probability of selecting a shortest frame image in a multi-frame synthesis process; and the shortest frame brightness adjustment parameter is adjusted to reduce a brightness value of the shortest frame image.

Specifically, the shortest frame brightness adjustment parameter includes an exposure ratio of the camera.

Correspondingly, the fringe suppression module 530 is configured to: calculate an average brightness value of the shortest frame image according to at least two frame images shot by the camera; calculate an exposure ratio increase amplitude according to the average brightness value and a preset incremental correspondence, where in the incremental correspondence, the average brightness value is positively correlated with the exposure ratio increase amplitude; and keep longest frame shutter time unchanged, and increase the exposure ratio of the camera according to the exposure ratio increase amplitude, to reduce the brightness value of the shortest frame image.

On the basis of the above technical schemes, the fringe action parameter acquisition module 520 is configured to acquire longest frame shutter time matched with a multi-frame synthesis shooting manner and/or a longest frame selection brightness threshold matched with a multi-frame synthesis shooting manner among the shooting parameters of the camera as the fringe action parameter.

Correspondingly, the fringe suppression module 530 is configured to perform at least one of the following steps: the longest frame shutter time is adjusted to be integral multiple of half of a preset artificial light source alternating current period so as to eliminate fringe in a longest frame image; and a value of the longest frame selection brightness threshold is increased according to a second ratio to increase a probability of selecting a longest frame image in a multi-frame synthesis process.

On the basis of the above technical schemes, the fringe recognition module 510 includes a brightness recognition parameter acquisition unit and a fringe recognition unit. The brightness recognition parameter acquisition unit is configured to acquire a brightness recognition parameter of a current shooting environment of the camera. The fringe recognition unit is configured to: acquire the image shot by the camera and recognize the fringe of the image based on a determination result that a brightness of the current shooting environment satisfies a fringe recognition condition according to the brightness recognition parameter; and control the camera to continuously shoot images according to a default configuration parameter matched with the current shooting environment based on a determination result that the brightness of the current shooting environment does not satisfy the fringe recognition condition according to the brightness recognition parameter.

In an embodiment, the apparatus for automatically detecting and suppressing fringes further includes a configuration recovery module. The configuration recovery module is configured to: after the parameter adjustment on the fringe action parameter is performed by adopting the parameter adjustment strategy matched with the fringe action parameter, acquire a brightness recognition parameter matched with a current shooting environment of the camera; control the camera to continuously shoot images according to a default configuration parameter matched with the current shooting environment based on a determination result that a brightness of the current shooting environment satisfies a configuration recovery condition according to the brightness recognition parameter; and keep the current configuration parameter of the camera to continuously shoot images based on a determination result that the brightness of the current shooting environment does not satisfy the configuration recovery condition according to the brightness recognition parameter.

The apparatus for automatically detecting and suppressing fringes provided in the embodiments of the present application can perform the method for automatically detecting and suppressing fringes provided in any embodiment of the present application, and has corresponding functional modules and beneficial effects for performing the method.

Embodiment Six

Figure 6:
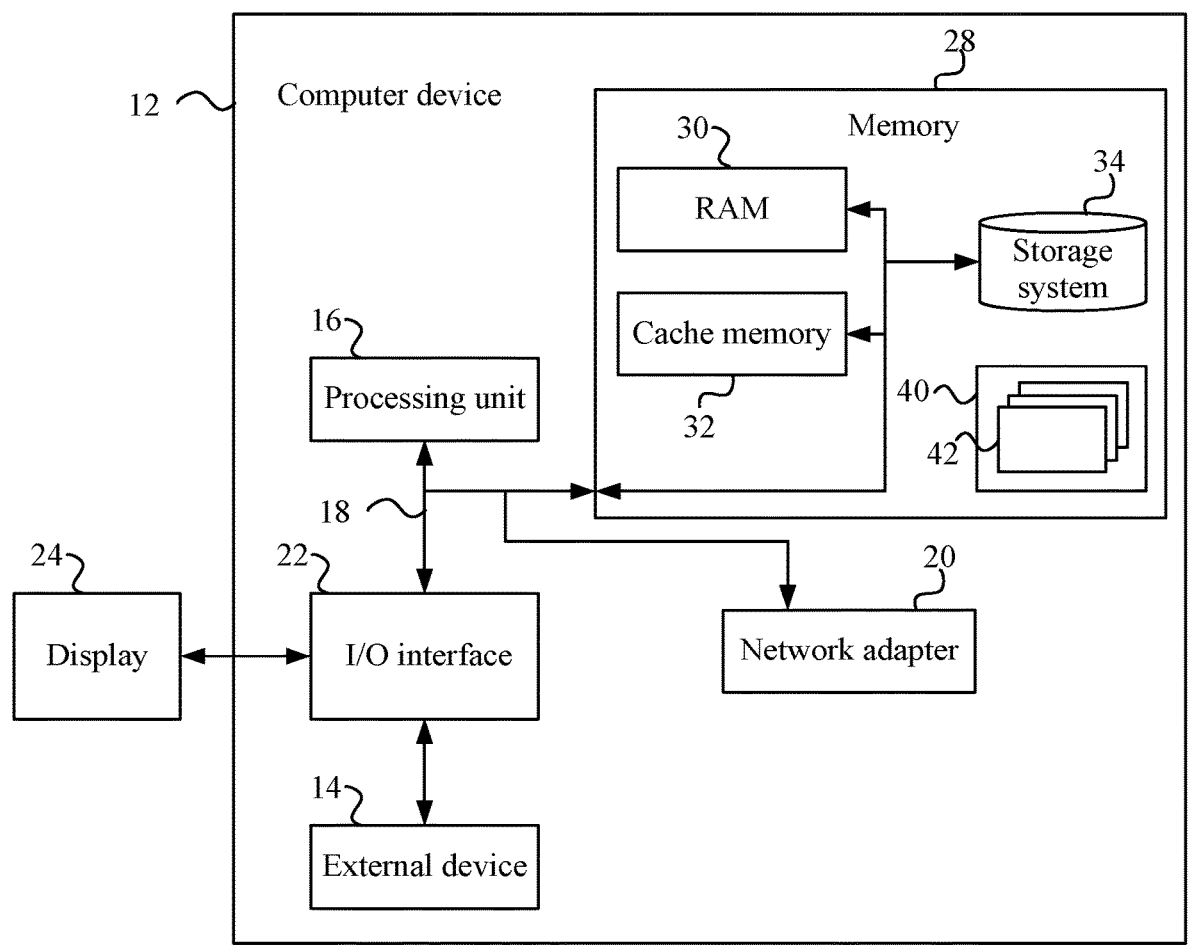
FIG. 6 is a schematic structural diagram of a computer device in embodiment six of the present application.

FIG. 6 is a schematic structural diagram of a computer device provided in embodiment six of the present application. FIG. 6 shows a block diagram of an exemplary computer device 12 suitable for use in implementing embodiments of the present application.

As shown in FIG. 6, the computer device 12 is represented in a form of a general purpose computing device. The components of the computer device 12 may include, but are not limited to, one or more processors (which may be a processing unit 16), a system memory 28, and a bus 18 that connects various system assemblies (including the system memory 28 and the processing unit 16).

The bus 18 represents one or more of several types of bus structures, including a memory bus or a memory controller, a peripheral bus, an accelerated graphics port, a processor, or a local bus using any of a variety of bus structures. By way of example, these architectures include, but are not limited to, an industry standard architecture (ISA) bus, a micro channel architecture (MAC) bus, an enhanced ISA bus, a video electronics standards association (VESA) local bus, and a peripheral assembly interconnect (PCI) bus.

The computer device 12 may include a variety of computer system readable media. These media may be any available media that may be accessed by the computer device 12, including volatile and nonvolatile media, removable and non-removable media.

The system memory 28 may include a computer system readable medium in a form of a volatile memory, such as a random access memory (RAM) 30 and a cache memory 32. The computer device 12 may further include other removable/non-removable, volatile/nonvolatile computer system storage media. By way of example only, a storage system 34 may be provided for reading from and writing to a non-removable and non-volatile magnetic media (not shown in FIG. 6, commonly referred to as a "hard drive"). Although not shown in FIG. 6, a magnetic disk drive for reading from and writing to a removable and non-volatile magnetic disk (such as a "floppy disk"), and an optical disk drive for reading from and writing to a removable and non-volatile optical disk (such as a CD-ROM, DVD-ROM or other optical media) may be provided. In such instances, each drive may be connected to the bus 18 through one or more data media interfaces. The memory 28 may include at least one program product having a set (such as at least one) of program modules, and these program modules are configured to perform the functions of each of the embodiments of the present application.

A program/utility 40, having a set (at least one) of program modules 42, may be stored, for example, in the memory 28. Such program modules 42 include, but are not limited to, an operating system, one or more application programs, other program modules, and program data, and each or some combination of these examples may include an implementation of a network environment. The program modules 42 generally perform the functions and/or methods in the embodiments described herein.

The computer device 12 may also be in communication with one or more external devices 14 (such as a keyboard, a pointing device, a display 24), and may also be in communication with one or more devices that enable a user to interact with the computer device 12, and/or in communication with any devices (such as a network card, a modem) that enable the computer device 12 to communicate with one or more other computing devices. Such communication may occur via an input/output (I/O) interface 22. Moreover, the computer device 12 may also communicate with one or more networks (such as a local area network (LAN), a wide area network (WAN), and/or a public network such as the Internet) via a network adapter 20. As shown in FIG. 6, the network adapter 20 communicates with other modules of the computer device 12 via the bus 18. It should be appreciated that although not shown in FIG. 6, other hardware and/or software modules may be used in connection with the computer device 12, including but not limited to: a microcode, a device drive, a redundant processing unit, an external disk drive array, a RAID system, a tape drive, and a data backup storage system, etc.

The processing unit 16 executes various functional applications and data processing by running programs stored in the system memory 28, so as to implement the method for automatically detecting and suppressing fringes provided by the embodiments of the present application. That is to say, the processing unit, when executing the programs, implements the following steps: an image shot by a camera is acquired, and a fringe of the image is recognized; If it is determined that fringe exists in the image, at least one fringe action parameter is acquired among shooting parameters of the camera; and a parameter adjustment is performed on the fringe action parameter by adopting a parameter adjustment strategy matched with the fringe action parameter, to perform fringe suppression on the image shot by the camera.

This embodiment further provides an electronic device, and the electronic device may be the computer device described above.

Embodiment Seven

This embodiment provides a computer-readable storage medium stored with computer programs. The programs, when executed by a processor, implement the method for automatically detecting and suppressing fringes as provided by all embodiments herein. That is to say, the programs, when executed by the processor, implement the following steps: an image shot by a camera is acquired, and a fringe of the image is recognized; at least one fringe action parameter is acquired among shooting parameters of the camera based on a recognition result obtained by recognizing the fringe of the image; and a parameter adjustment is performed on the fringe action parameter by adopting a parameter adjustment strategy matched with the fringe action parameter, to perform fringe suppression on the image shot by the camera.

The computer storage media of the embodiments of the present application may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. More specific examples (a non-exhaustive list) of the computer-readable storage medium include: an electrical-connection and portable computer diskette having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In this context, the computer-readable storage medium may be any tangible medium that contains or stores a program for use by or in connection with an instruction execution system, apparatus, or device.

The computer-readable signal medium may include a propagated data signal with a computer-readable program code carried therein, for example, in a baseband or as part of a carrier wave. Such a propagated data signal may adopt a variety of forms, including, but not limited to: an electromagnetic signal, an optical signal, or any suitable combination of the foregoing. The computer-readable signal medium may be any computer-readable medium other than a computer-readable storage medium and that may transmit, propagate, or transport a program for use by or in connection with an instruction execution system, apparatus, or device.

Program codes embodied on the computer-readable medium may be transmitted using any appropriate medium, including but not limited to: wireless, wire, optic cable, RF, etc., or any suitable combination of the foregoing.

A computer program code for performing the operations of the present application may be written in one or more programming languages or combinations thereof, the described programming languages include an object-oriented programming language—such as Java, Smalltalk, C++, and further include a conventional procedural programming language—such as a "C" language or similar programming language. The program code may be executed in following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

What is claimed is:

1. A method for automatically detecting and suppressing fringes, comprising:
    acquiring an image shot by a camera, and recognizing a fringe of the image;
    acquiring at least one fringe action parameter among shooting parameters of the camera based on a recognition result obtained by recognizing the fringe of the image; and
    performing a parameter adjustment on the acquired at least one fringe action parameter by adopting a parameter adjustment strategy matched with the acquired at least one fringe action parameter to perform fringe suppression on the image shot by the camera;
    wherein acquiring the image shot by the camera, and the recognizing the fringe of the image comprises:
    acquiring the image shot by the camera, and constructing a feature matrix matched with a detection area according to feature information of each pixel point within the detection area in the image; wherein, a matrix value of the each pixel point which is in the feature matrix and associated with the fringe is a first numerical value, and a matrix value of the each pixel point which is in the feature matrix and not associated with the fringe is a second numerical value;
    performing a convolution operation on the feature matrix and a preset fringe feature matrix; and
    determining that the fringe exists in the image based on a determination result that a convolution operation result satisfies a preset numerical condition.

2. The method of claim 1, wherein the feature information is chrominance information of the each pixel point;
    before constructing the feature matrix matched with the detection area according to the feature information of the each pixel point within the detection area in the image, the method further comprises:
    acquiring a red, blue, green (RBG) value of the each pixel point within the detection area in the image, and converting the RBG value into a corresponding YUV value, wherein Y represents brightness information, U and V represent color information; and
    using a V value of the each pixel point as the feature information of the each pixel point.

3. The method of claim 1, wherein the constructing the feature matrix matched with the detection area according to the feature information of the each pixel point within the detection area in the image comprises:
    calculating an average intensity of the feature information according to an image resolution of the detection area and the feature information of the each pixel point;
    constructing a standard feature matrix according to the image resolution of the detection area;
    acquiring one matrix element position of the standard feature matrix as a target matrix position;
    setting an element value of the target matrix position as the first numerical value based on a determination result that feature information of the each pixel point corresponding to the target matrix position is greater than the average intensity; and
    setting the element value of the target matrix position as the second numerical value based on a determination result that the feature information of the each pixel point corresponding to the target matrix position is less than or equal to the average intensity.

4. The method of claim 1, wherein,
    acquiring the at least one fringe action parameter among the shooting parameters of the camera comprises:
    acquiring, among the shooting parameters of the camera, at least one of the following as the at least one fringe action parameter: a shortest frame selection brightness threshold matched with a multi-frame synthesis shooting manner, or a shortest frame brightness adjustment parameter matched with the multi-frame synthesis shooting manner;
    performing the parameter adjustment on the acquired at least one fringe action parameter by adopting the parameter adjustment strategy matched with the acquired at least one fringe action parameter to perform the fringe suppression on the image shot by the camera comprises at least one of:
    increasing a value of the shortest frame selection brightness threshold according to a first ratio to reduce a probability of selecting a shortest frame image in a multi-frame synthesis process, wherein the acquired at least one fringe action parameter comprises the shortest frame selection brightness threshold; or
    adjusting the shortest frame brightness adjustment parameter to reduce a brightness value of the shortest frame image, wherein the acquired at least one fringe action parameter comprises the shortest frame brightness adjustment parameter.

5. The method of claim 4, wherein the shortest frame brightness adjustment parameter comprises an exposure ratio of the camera, wherein adjusting the shortest frame brightness adjustment parameter to reduce the brightness value of the shortest frame image comprises:
calculating an average brightness value of the shortest frame image according to at least two frame images shot by the camera;
calculating an exposure ratio increase amplitude according to the average brightness value and a preset incremental correspondence; wherein in the preset incremental correspondence, the average brightness value is positively correlated with the exposure ratio increase amplitude; and
keeping longest frame shutter time unchanged, and increasing the exposure ratio of the camera according to the exposure ratio increase amplitude to reduce the brightness value of the shortest frame image.

6. The method of claim 1, wherein,
acquiring the at least one fringe action parameter among the shooting parameters of the camera comprises:
acquiring, among the shooting parameters of the camera, at least one of the following as the at least one fringe action parameter: longest frame shutter time matched with a multi-frame synthesis shooting manner, or a longest frame selection brightness threshold matched with the multi-frame synthesis shooting manner;
performing the parameter adjustment on the acquired at least one fringe action parameter by adopting the parameter adjustment strategy matched with the acquired at least one fringe action parameter to perform the fringe suppression on the image shot by the camera comprises at least one of:
adjusting the longest frame shutter time to be integral multiple of half of a preset artificial light source alternating current period, wherein the acquired at least one fringe action parameter comprises the longest frame shutter time; or
increasing a value of the longest frame selection brightness threshold according to a second ratio to increase a probability of selecting a longest frame image in a multi-frame synthesis process, wherein the acquired at least one fringe action parameter comprises the longest frame selection brightness threshold.

7. The method of claim 1, wherein acquiring the image shot by the camera, and recognizing the fringe of the image comprises:
acquiring a brightness recognition parameter of a current shooting environment of the camera; and
acquiring the image shot by the camera and recognizing the fringe of the image based on a determination result that a brightness of the current shooting environment satisfies a fringe recognition condition according to the brightness recognition parameter.

8. The method of claim 7, after acquiring the brightness recognition parameter of the current shooting environment of the camera, the method further comprises:
controlling the camera to continue to shoot images according to a default configuration parameter matched with the current shooting environment based on a determination result that the brightness of the current shooting environment does not satisfy the fringe recognition condition according to the brightness recognition parameter.

9. The method of claim 1, wherein after performing the parameter adjustment on the acquired at least one fringe action parameter by adopting the parameter adjustment strategy matched with the acquired at least one fringe action parameter, the method further comprises:

acquiring a brightness recognition parameter matched with a current shooting environment of the camera; and
controlling the camera to continue to shoot images according to a default configuration parameter matched with the current shooting environment based on a determination result that a brightness of the current shooting environment satisfies a configuration recovery condition according to the brightness recognition parameter.

10. An apparatus for automatically detecting and suppressing fringes, comprising:
a processor; and
a memory for storing instructions executable by the processor;
wherein the processor is configured to:
acquire an image shot by a camera and recognize a fringe of the image;
acquire at least one fringe action parameter among shooting parameters of the camera based on a recognition result obtained by recognizing the fringe of the image; and
perform a parameter adjustment on the acquired at least one fringe action parameter by adopting a parameter adjustment strategy matched with the acquired at least one fringe action parameter to perform fringe suppression on the image shot by the camera;
wherein the processor is configured to acquire the image shot by the camera and recognize the fringe of the image by at least:
acquiring the image shot by the camera, and construct a feature matrix matched with a detection area according to feature information of each pixel point within the detection area in the image; wherein, a matrix value of the each pixel point which is in the feature matrix and associated with the fringe is a first numerical value, and a matrix value of the each pixel point which is in the feature matrix and not associated with the fringe is a second numerical value;
performing a convolution operation on the feature matrix and a preset fringe feature matrix; and
determining that the fringe exists in the image based on a determination result that a convolution operation result satisfies a preset numerical condition.

11. The apparatus of claim 10, wherein the feature information is chrominance information of the each pixel point, and the processor is further configured to acquire the image shot by the camera and recognize the fringe of the image by at least:
acquiring a red, blue, green (RGB) value of the each pixel point within the detection area in the image, and convert the RBG value into a corresponding YUV value, wherein Y represents brightness information, U and V represent color information; and
using a V value of the each pixel point as the feature information of the each pixel point.

12. The apparatus of claim 10, wherein the processor is configured to acquire the image shot by the camera, and construct the feature matrix matched with the detection area according to the feature information of the each pixel point within the detection area in the image by at least:
calculating an average intensity of the feature information according to an image resolution of the detection area and the feature information of the each pixel point;
constructing a standard feature matrix according to the image resolution of the detection area;
acquiring one matrix element position of the standard feature matrix as a target matrix position;

setting an element value of the target matrix position as the first numerical value based on a determination result that feature information of the each pixel point corresponding to the target matrix position is greater than the average intensity; and setting the element value of the target matrix position as the second numerical value based on a determination result that the feature information of the each pixel point corresponding to the target matrix position is less than or equal to the average intensity.

13. The apparatus of claim 10, wherein the processor is configured to perform the parameter adjustment on the acquired at least one fringe action parameter by adopting the parameter adjustment strategy matched with the acquired at least one fringe action parameter to perform the fringe suppression on the image shot by the camera by at least one of:

increasing a value of the shortest frame selection brightness threshold according to a first ratio to reduce a probability of selecting a shortest frame image in a multi-frame synthesis process, wherein the acquired at least one fringe action parameter comprises the shortest frame selection brightness threshold matched with a multi-frame synthesis shooting manner;

adjusting the shortest frame brightness adjustment parameter to reduce a brightness value of the shortest frame image, wherein the acquired at least one fringe action parameter comprises the shortest frame brightness adjustment parameter matched with the multi-frame synthesis shooting manner;

adjusting longest frame shutter time to be integral multiple of half of a preset artificial light source alternating current period, wherein the acquired at least one fringe action parameter comprises the longest frame shutter time matched with the multi-frame synthesis shooting manner; or increasing a value of the longest frame selection brightness threshold according to a second ratio to increase a probability of selecting a longest frame image in a multi-frame synthesis process, wherein the acquired at least one fringe action parameter comprises the longest frame selection brightness threshold matched with the multi-frame synthesis shooting manner.

14. The apparatus of claim 13, wherein the shortest frame brightness adjustment parameter comprises an exposure ratio of the camera, and the processor is further configured to perform the parameter adjustment on the acquired at least one fringe action parameter by adopting the parameter adjustment strategy matched with the acquired at least one fringe action parameter to perform the fringe suppression on the image shot by the camera by at least:

calculating an average brightness value of the shortest frame image according to at least two frame images shot by the camera;

calculating an exposure ratio increase amplitude according to the average brightness value and a preset incremental correspondence; wherein in the preset incremental correspondence, the average brightness value is positively correlated with the exposure ratio increase amplitude; and keeping longest frame shutter time unchanged, and increase the exposure ratio of the camera according to the exposure ratio increase amplitude to reduce the brightness value of the shortest frame image.

15. The apparatus of claim 10, wherein the processor is configured to acquire the image shot by the camera and recognize the fringe of the image by at least:

acquiring a brightness recognition parameter of a current shooting environment of the camera; and acquiring the image shot by the camera and recognizing the fringe of the image based on a determination result that a brightness of the current shooting environment satisfies a fringe recognition condition according to the brightness recognition parameter.

16. The apparatus of claim 10, wherein the processor is further configured to:

acquire a brightness recognition parameter of a current shooting environment of the camera; and control the camera to continue to shoot images according to a default configuration parameter matched with the current shooting environment based on a determination result that a brightness of the current shooting environment satisfies a configuration recovery condition according to the brightness recognition parameter.

17. A non-transitory computer-readable storage medium, storing computer programs, wherein the computer programs, when executed by a processor, implement the method for automatically detecting and suppressing fringes of claim 1.

18. A method for automatically detecting and suppressing fringes, comprising:

acquiring an image shot by a camera, and recognizing a fringe of the image;

acquiring at least one fringe action parameter among shooting parameters of the camera based on a recognition result obtained by recognizing the fringe of the image; and performing a parameter adjustment on the acquired at least one fringe action parameter by adopting a parameter adjustment strategy matched with the acquired at least one fringe action parameter to perform fringe suppression on the image shot by the camera;

wherein acquiring the at least one fringe action parameter among the shooting parameters of the camera comprises:

acquiring, among the shooting parameters of the camera, at least one of the following as the at least one fringe action parameter: a shortest frame selection brightness threshold matched with a multi-frame synthesis shooting manner, or a shortest frame brightness adjustment parameter matched with the multi-frame synthesis shooting manner;

performing the parameter adjustment on the acquired at least one fringe action parameter by adopting the parameter adjustment strategy matched with the acquired at least one fringe action parameter to perform the fringe suppression on the image shot by the camera comprises at least one of:

increasing a value of the shortest frame selection brightness threshold according to a first ratio to reduce a probability of selecting a shortest frame image in a multi-frame synthesis process, wherein the acquired at least one fringe action parameter comprises the shortest frame selection brightness threshold; or adjusting the shortest frame brightness adjustment parameter to reduce a brightness value of the shortest frame image, wherein the acquired at least one fringe action parameter comprises the shortest frame brightness adjustment parameter.

19. The method of claim 18, wherein the shortest frame brightness adjustment parameter comprises an exposure ratio of the camera, wherein adjusting the shortest frame brightness adjustment parameter to reduce the brightness value of the shortest frame image comprises:

calculating an average brightness value of the shortest frame image according to at least two frame images shot by the camera;

calculating an exposure ratio increase amplitude according to the average brightness value and a preset incremental correspondence; wherein in the preset incremental correspondence, the average brightness value is positively correlated with the exposure ratio increase amplitude; and keeping longest frame shutter time unchanged, and increasing the exposure ratio of the camera according to the exposure ratio increase amplitude to reduce the brightness value of the shortest frame image.

20. The method of claim 18, wherein acquiring the image shot by the camera, and recognizing the fringe of the image comprises:

acquiring a brightness recognition parameter of a current shooting environment of the camera; and acquiring the image shot by the camera and recognizing the fringe of the image based on a determination result that a brightness of the current shooting environment satisfies a fringe recognition condition according to the brightness recognition parameter.

* * * * *